US009519902B2

(12) United States Patent
Amancherla et al.

(10) Patent No.: US 9,519,902 B2
(45) Date of Patent: Dec. 13, 2016

(54) FRAUD MONITORING SYSTEM WITH DISTRIBUTED CACHE

(71) Applicant: Quisk, Inc., Sunnyvale, CA (US)

(72) Inventors: Praveen Amancherla, Cupertino, CA (US); Kumar Kartikeya, Cupertino, CA (US)

(73) Assignee: Quisk, Inc., Sunnyvale, CA (US)

( * ) Notice: Subject to any disclaimer, the term of this patent is extended or adjusted under 35 U.S.C. 154(b) by 0 days.

(21) Appl. No.: 14/162,316

(22) Filed: Jan. 23, 2014

(65) Prior Publication Data

US 2014/0379561 A1 Dec. 25, 2014

Related U.S. Application Data

(60) Provisional application No. 61/839,062, filed on Jun. 25, 2013.

(51) Int. Cl.
*G06Q 40/00* (2012.01)
*G06Q 20/40* (2012.01)
(Continued)

(52) U.S. Cl.
CPC .......... *G06Q 20/4016* (2013.01); *G06Q 20/40* (2013.01); *G06F 11/3409* (2013.01);
(Continued)

(58) Field of Classification Search
CPC ........ G06Q 40/00; G06Q 20/10; G06Q 20/40; G06Q 20/405; G06Q 20/04; G06Q 20/382; G06Q 20/4016; G06F 17/30902; G06F 2201/80; G06F 2201/82; G06F 17/3048; G06F 11/3409; G06F 17/30575; G06F 17/30578; G06F 13/4243
(Continued)

(56) References Cited

U.S. PATENT DOCUMENTS 6,457,047 B1 * 9/2002 Chandra ........... G06F 17/30902
707/E17.12
6,489,935 B1 * 12/2002 Amundsen .............. G07F 17/16
709/206
(Continued)

FOREIGN PATENT DOCUMENTS

WO 2013074876 A 5/2013
WO 2013082190 A1 6/2013

OTHER PUBLICATIONS

Carr, D. F. (2000). Top 5 headaches. Internet World, 6(18), 78. Retrieved from http://dialog.proquest.com/professional/docview/668143871?accountid=142257 on Aug. 3, 2016.*
(Continued)

*Primary Examiner* — Kito R Robinson
(74) *Attorney, Agent, or Firm* — The Mueller Law Office, P.C.

(57) ABSTRACT

Systems and methods for fraud monitoring in a payment service are disclosed. An exemplary system includes a first server being located at a first locale and routing a first series of transaction requests. The system includes a second server being located at a second locale and routing a second series of transaction requests. The transactions requests may or may not be associated with a single payment service user account. The system includes a distributed cache storing a set of transaction details of the two series of transaction requests. The system includes a risk service having access to the set of transaction details from the distributed cache. The risk service generates a fraud warning based on a result of a comparison of at least one transaction detail in the set of transaction details and at least one transaction detail of a new transaction request received by the first server.

20 Claims, 4 Drawing Sheets

(51) Int. Cl.
  *G06F 13/42* (2006.01)
  *G06F 17/30* (2006.01)
  *G06F 11/34* (2006.01)

(52) U.S. Cl.
  CPC ...... *G06F 13/4243* (2013.01); *G06F 17/3048* (2013.01); *G06F 17/30575* (2013.01); *G06F 17/30578* (2013.01); *G06F 2201/80* (2013.01); *G06F 2201/82* (2013.01); *G06F 2212/254* (2013.01); *G06Q 40/00* (2013.01)

(58) Field of Classification Search
  USPC .......................................................... 705/39
  See application file for complete search history.

(56) References Cited

U.S. PATENT DOCUMENTS

| | | | | |
|---|---|---|---|---|
| 6,564,218 | B1* | 5/2003 | Roth | G06F 17/30902 |
| 6,671,757 | B1* | 12/2003 | Multer | H04L 67/1095 |
| | | | | 707/999.201 |
| 6,792,436 | B1* | 9/2004 | Zhu | G06F 17/30902 |
| 6,810,259 | B1* | 10/2004 | Zhang | H04W 8/18 |
| | | | | 455/435.1 |
| 7,177,886 | B2* | 2/2007 | Pruet, III | G06F 17/30578 |
| 7,237,030 | B2* | 6/2007 | Chakraborty | G06F 17/30902 |
| | | | | 707/999.009 |
| 7,257,611 | B1 | 8/2007 | Shankar et al. | |
| 7,363,373 | B2 | 4/2008 | Lu et al. | |
| 7,596,523 | B2* | 9/2009 | Sobel | G06Q 40/00 |
| | | | | 705/36 R |
| 7,613,742 | B2* | 11/2009 | Bohannon | G06F 11/1662 |
| 7,657,497 | B2* | 2/2010 | Nandy | G06N 5/025 |
| | | | | 706/45 |
| 8,078,538 | B1* | 12/2011 | Buch | G06Q 20/10 |
| | | | | 455/10 |
| 8,102,980 | B2 | 1/2012 | Krishnamoorthy et al. | |
| 8,209,548 | B2* | 6/2012 | Botzum | G06F 12/1408 |
| | | | | 713/189 |
| 8,413,160 | B2* | 4/2013 | Armes | G06F 9/505 |
| | | | | 709/226 |
| 8,600,871 | B1* | 12/2013 | Tavares | G06Q 40/02 |
| | | | | 705/35 |
| 8,805,984 | B2* | 8/2014 | Markus | G06F 9/466 |
| | | | | 709/223 |
| 2004/0064650 | A1* | 4/2004 | Johnson | G06F 17/30902 |
| | | | | 711/141 |
| 2004/0158588 | A1* | 8/2004 | Pruet, III | G06F 17/30578 |
| 2006/0010252 | A1* | 1/2006 | Miltonberger | G07F 17/32 |
| | | | | 709/245 |
| 2006/0149713 | A1* | 7/2006 | Walker | G06F 17/3048 |
| 2008/0162259 | A1* | 7/2008 | Patil | G06Q 30/02 |
| | | | | 705/7.29 |
| 2009/0024533 | A1* | 1/2009 | Fernandes | G06Q 20/401 |
| | | | | 705/75 |
| 2009/0157519 | A1* | 6/2009 | Bishop | G06Q 20/02 |
| | | | | 705/19 |
| 2009/0222891 | A1 | 9/2009 | Heffez | |
| 2010/0051684 | A1* | 3/2010 | Powers | G06Q 30/06 |
| | | | | 235/379 |
| 2010/0106611 | A1* | 4/2010 | Paulsen | G06Q 20/10 |
| | | | | 705/26.1 |
| 2011/0078287 | A1* | 3/2011 | Pacella | G06F 17/3087 |
| | | | | 709/219 |
| 2011/0137789 | A1* | 6/2011 | Kortina | G06Q 20/405 |
| | | | | 705/38 |
| 2011/0307388 | A1* | 12/2011 | Kim | G06Q 20/12 |
| | | | | 705/67 |
| 2012/0066079 | A1* | 3/2012 | Falzone | G06Q 20/20 |
| | | | | 705/16 |
| 2013/0013491 | A1 | 1/2013 | Selway et al. | |
| 2013/0018795 | A1 | 1/2013 | Kolhatkar et al. | |
| 2013/0024300 | A1 | 1/2013 | Choudhuri et al. | |
| 2013/0046692 | A1* | 2/2013 | Grigg | G06Q 40/00 |
| | | | | 705/44 |
| 2013/0085988 | A1* | 4/2013 | Hiraguchi | G06F 17/30371 |
| | | | | 707/609 |
| 2013/0332358 | A1* | 12/2013 | Zhao | G06Q 20/12 |
| | | | | 705/44 |

OTHER PUBLICATIONS

Qian, H., Surapaneni, C. S., Ray, M., Dispensa, S., & Medhi, D. (2010). DReaM-cache: Distributed real-time transaction memory cache to support two-factor authentication services and its reliability doi:http://dx.doi.org/10.1109/NOMS.2010.5488486 on Aug. 3, 2016.*

Financial times adopts news management system built on versant and EidosMedia technology. (Oct. 9, 2002). PR Newswire Retrieved from http://dialog.proquest.com/professional/docview/666098093?accountid=142257 on Aug. 3, 2016.*

U.S. Appl. No. 13/755,421 for "Self-authenticating peer-to-peer transaction" filed Jan. 31, 2013.

International Search Report and Written Opinion dated Oct. 16, 2014 for PCT Patent Application No. PCT/US2014/043935.

* cited by examiner

FRAUD MONITORING SYSTEM WITH DISTRIBUTED CACHE

CROSS-REFERENCE TO RELATED APPLICATIONS

This application claims the benefit of U.S. Provisional Application No. 61/839,062, filed Jun. 25, 2013, the contents of which are hereby incorporated by reference.

BACKGROUND OF THE INVENTION

People expect payment transactions, such as credit card payments made at a point of sale terminal or through a web interface, to be processed in a matter of seconds. In those few seconds, the payment processor needs to receive the transaction request, perform various checks on the transaction, and send a return message authorizing the transaction. If the duration of any of the steps is increased—even on the order of a few seconds—the payment approval process will seem long and inconvenient to a user that is accustomed to having their transactions processed at near instantaneous speeds. However, the potential for fraudulent and misprocessed transactions forces payment processors to sometimes take more time when handling the approval process. Misprocessed transactions must generally be rectified through the application of costly human capital, and the cost of fraud represents both a direct loss to the processor as well as an indirect cost associated with the erosion of trust between the payment processors and their customers. Payment processors must therefore balance the additional time savings that may be afforded to a user of their payment service against the cost of potentially allowing fraudulent or misprocessed transactions to slip through the system.

A payment processing system 100 for a payment service is display in FIG. 1. System 100 comprises a user 101 conducting a purchase transaction using system 100 via a mobile telephone 102. Payment processing system 100 is enabled through the use of multiple servers. In this sense, payment processing system 100 is exemplary of nearly all modern payment processing systems. Payment systems are generally serviced through the use of geographically disperse datacenters that allow the payment system to be accessed wherever user 101 might be. For example, in payment processing system 100, servers 103 and 104 are located in different datacenters, but either server can be used to process a payment on behalf of user 100. In addition, when a payment processing system is dealing with a high volume of transactions, certain servers in the network can become overloaded. To more evenly distribute the volume of payments processing requests, a load balancer such as load balancer 105 can be employed to evenly divide payment processing services between servers such as servers 104 and 106.

Proper book keeping requires centralized access to every transaction conducted by a given account regardless of what server actually processed the payment request. As a result, the payment processor needs a central location at which all of the accounts can be reconciled. In system 100, accounts are reconciled at central database 107 which receives payment transactions from servers 103, 104, and 106.

SUMMARY

Disclosed herein are systems, methods, and computer-readable media for a fraud monitoring system with a distributed cache. The systems can perform the described methods and can be stored on the computer-readable media. As used herein, the term "locale" refers to the common industry definition of a hardware locale (i.e., a localized set of hardware resources that are close enough to enjoy uniform memory access to the same physical memory).

A system for fraud monitoring with a distributed cache is disclosed. The system comprises a first server being located at a first locale and routing a first series of transaction requests for a payment service. The system also comprises a second server being located at a second locale and routing a second series of transaction requests for the payment service. The system also comprises a distributed cache storing a set of transaction details of the first and second series of transaction requests. The system also comprises a risk service operating at the first locale and having access to the set of transaction details from the distributed cache. The risk service generates a fraud warning based on a result of a comparison of the set of transaction details and a transaction detail of a new transaction request received at the first server.

A computer-implemented process for fraud monitoring is also disclosed. The method comprises processing a first series of transaction requests at a first server. The method also comprises processing a second series of transaction requests at a second server. The method also comprises storing historical transaction information concerning transactions associated with the first and the second series of transaction requests in a distributed cache. The method also comprises receiving a transaction request. The method also comprises conducting a comparison of information regarding the transaction request with the historical transaction information. The method also comprises issuing a fraud warning based on results of the comparison. The first and the second series of transactions are associated with a single user account. The first and second servers are in different locales.

Another system for fraud monitoring is also disclosed. The system comprises a first server being located at a first locale routing a first series of transaction requests for a payment service. The system also comprises a second server being located at a second locale routing a second series of transaction requests for the payment service. The system also comprises a distributed cache storing a set of transaction details of the first and the second series of transaction requests. The system also comprises a risk service having access to the set of transaction details from the distributed cache. The risk service generates a fraud warning based on a result of a comparison of at least one transaction detail of a new transaction request received by the first server. The first and second series of transaction requests are associated with a single payment service user account.

DETAILED DESCRIPTION

Reference now will be made in detail to embodiments of the disclosed invention(s), one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Fraud monitoring generally requires the details of a current transaction to be compared to the details of prior transactions made using a funding source. The analysis focuses on patterns in the data to detect potential fraudulent transactions. For example, if one transaction took place in New York, and then another transaction took place in Los Angles within a short enough period of time, the fraud monitoring system would detect the potential for fraud because a person using the funding source could not be in both of those places at the same time. Fraud monitoring can also be based on other patterns such as tracking the cumulative amount of money spent using a particular funding source in a given period of time. For example, if more than $500 were spent in a single day, a fraud monitoring system would detect the potential for fraud based on the velocity of funds being drawn from that funding source. The details of prior transactions would need to be accessed in this example in order to calculate the total amount of money spent using the funding source and add it to the amount of money being spent using the current funding source.

Figure 1:
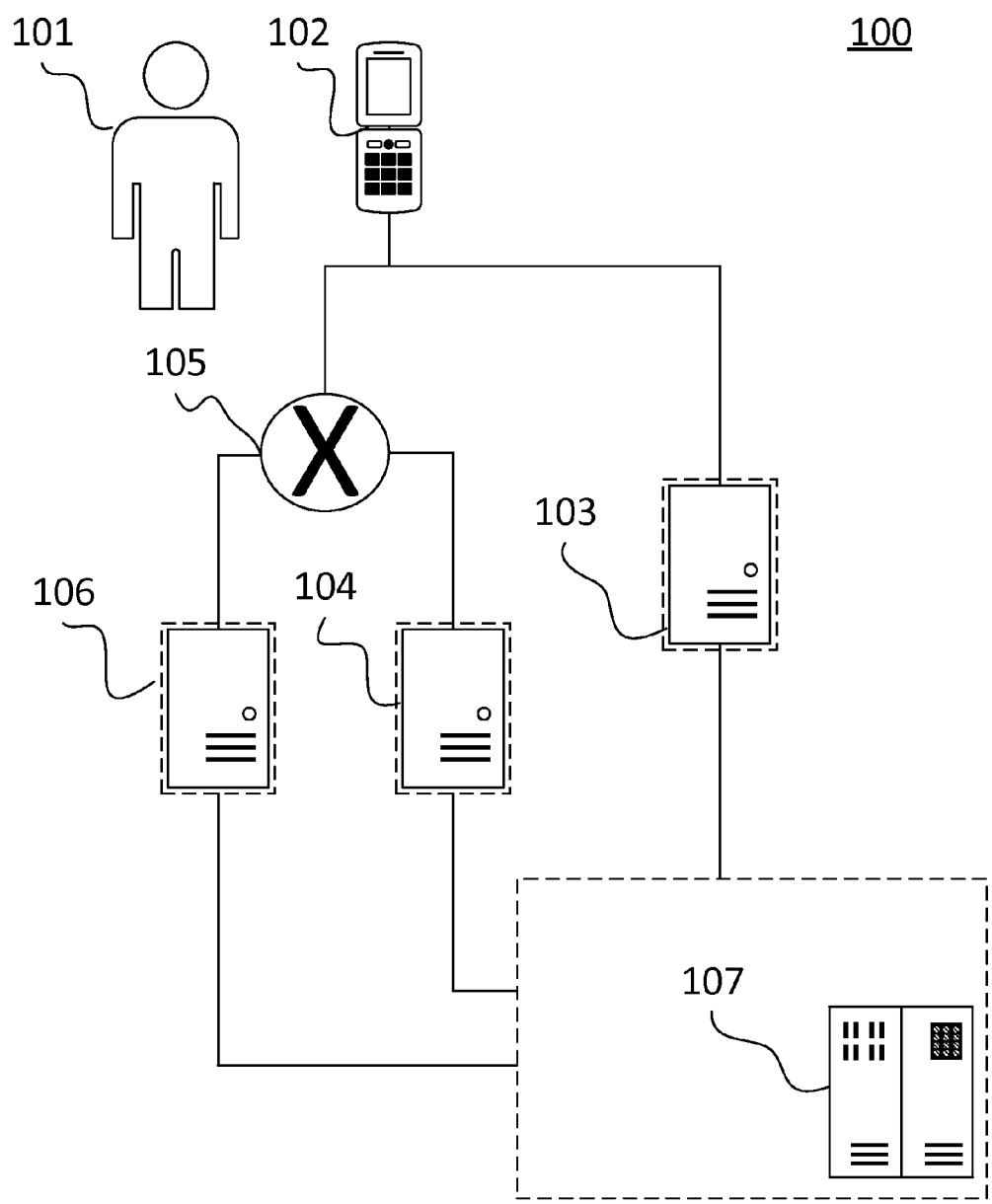
FIG. 1 illustrates a block diagram of a payment processing system in accordance with the related art.

Methods for facilitating fraud monitoring can be described with reference to system 100 in FIG. 1. As stated previously, certain fraud monitoring schemes require access to the details of prior transactions conducted on an account in order to function. One approach to providing this information to the fraud monitoring system is to allow the fraud monitoring system to check each transaction against data held in database 107. As a result, each transaction conducted in the payment system requires a call to the central database. In the interest of increasing the speed of the system, servers 103, 104, and 106 could be designed to approve transactions without access to central database 107. However, these approvals would therefore be issued with a potentially incomplete picture of the status of the account.

Embodiments of the present invention provide faster payment system authorization processing, require fewer calls to a central database, and provide the same level of fraud monitoring provided by slower and more resource hungry processing systems. These embodiments utilize a distributed cache to make prior transaction details or information about prior transactions available at each of the disparate servers used by the payment service. As a result, the information necessary for fraud monitoring can be made readily available for payment authorizations without requiring the servers to access—and bog down—a central server with their requests for information. In addition, the distributed cache can be cleared by a reaper process periodically to limit the resource requirements for the distributed cache. Since specific fraud monitoring methods only require access to transaction details from transactions conducted in a set time period in the recent past, the reaper window can be set to that time period, and the resulting savings in resources will not have any detrimental effect on the performance of the fraud monitoring system. As a specific example, monitoring based on the cumulative amount spent in a given time period can be monitored without any detrimental effect on the fraud monitoring system by preserving only the transactions that are within that time period. In certain embodiments, an additional benefit is provided in that the time at which each transaction takes place does not need to be stored in the distributed cache. Since the reaper process can be set to periodically clear transactions from the distributed cache, the reaper process will indirectly provide information to the fraud monitoring system as to the timing of the all transactions stored in the distributed cache.

Figure 2:
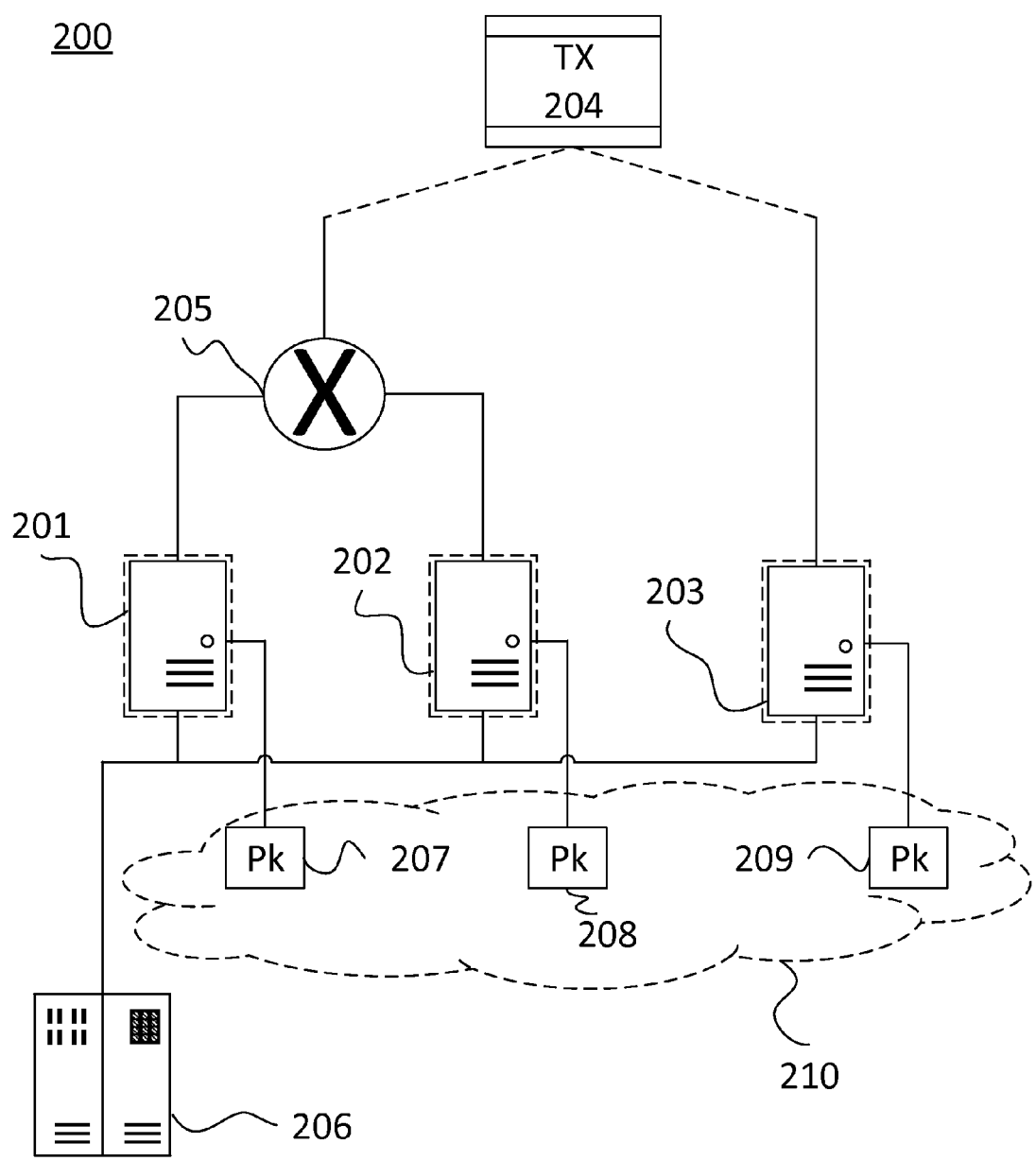
FIG. 2 illustrates a block diagram of a system for fraud monitoring in a payment system using a distributed cache.

FIG. 2 displays a payment system 200 for processing payment requests and providing fraud monitoring utilizing a distributed cache. Payment system 200 comprises three servers 201, 202, and 203. All of these servers are located at different locales such that none share uniform access to the same physical memory. Servers 201 and 202 can be located in the same datacenter and receive transaction requests 204 from load balancer 205. Server 203 is located at a different datacenter. Although a single transaction request 204 is illustrated, the system is designed to process a series of transaction requests that are continuously delivered to the system. Each of the three servers process their own individual series of transactions.

Transaction requests, such as transaction request 204, are received by payment system 200 from account holders of the payment service that administrates payment system 200. The requests may include requests to withdraw, deposit, send, or receive money using payment system 200. All of these types of requests can be referred to as transfer requests because funds are being transferred between various accounts in all of these cases. The payment service that administrates payment system 200 may or may not handle the actual transfer of funds between financial accounts that are associated with payment system 200. For example, the payment service may be partnered with an external financial institution that allows the account holders to transfer funds to and from the accounts that the financial institution administrates. The link between the payment system and the financial instruments involved in the underlying transactions is not illustrated in FIG. 2. However, it should be understood that transactions processed using system 200 can directly or indirectly reflect the actual transfer of funds between financial institutions.

Traditional fraud monitoring in system 200 would generally require access to a central database such as central database 206, which results in a detrimental increase in the time it would take payment system 200 to provide an approval for a transaction. In particular fraud monitoring processes, such as those based on calculating a cumulative amount spent by a purchaser in a given time period, the computational intensity of the process would further degrade the responsiveness of the payment system by placing computational demands on the central database in addition to data access demands. However, payment system 200 includes a group of risk services 207-9 located at the same locale as each server 201-3.

Risk services 207-9 each store a selection of transaction details regarding transactions processed in their individual series of transactions. The transaction details can include a time at which specific transactions take place, a location of the transaction, and amount involved in the transactions, the counterparties to the transaction, the financial institution associated with the transactions, and any other information that describes the circumstances and details of a transaction. Collectively, these transaction details comprise historical transaction information concerning the series of transactions requests received by the payment system. There may be one or more financial institutions associated with a particular transaction. For example, if the transaction is a purchase transaction transferring money form a buyer to a seller, the buyer and seller may have financial accounts with separate financial institutions, such that both the buyer's financial institution and the seller's financial institutions will be associated with the transaction. Furthermore, the transaction details can include details that are derived from information contained in the transaction requests. For example, the transaction details could include a cumulative amount of money spent on transactions involving a particular financial institution or spent by a specific user. As another example, the transaction details could include a cumulative distance between the locations associated with transactions involving a specific user. As such, the transaction details can include details that are calculated by risk service 207-09.

The transaction details obtained or calculated by risk services 207-9 are synchronized across each risk service in the system through the use of distributed cache 210. In this manner, each risk service has access to the transaction details obtained from the three series of transactions being processed by servers 201, 202 and 203. As a result, the most recently received transaction at server 203 may be analyzed using information obtained from transactions processed at servers 201 and 202 without having to access central database 206. Risk service 207-9 is therefore able to generate a fraud warning based on a comparison of at least one transaction detail in the set of transaction details available to the risk service and at least one transaction detail of a new transaction received by the system 200 regardless of which server processed the prior transactions.

Payment system 200 can be put into service in various implementations. The distributed cache could comprise an open source Java distributed cache such as Ehcache. Distributed cache 210 could also be a proprietary distributed caching system that is unique to the payment service. Servers 201, 202, and 203 may all be located in the same datacenter and they could all be located in different datacenters. Servers 201, 202, 203 could be based on magnetic or flash memory. The network linking each element in payment system 200 can comprise any number of interconnecting physical networks including Tier 1 networks, long-distance telephone networks, cable networks, mobile telephone networks, local wireless networks, or any kind of telecommunications network. Data in payment system 200 can be routed via the Internet, wide area networks, local area networks, or proprietary networks for the payment service.

Figure 3:
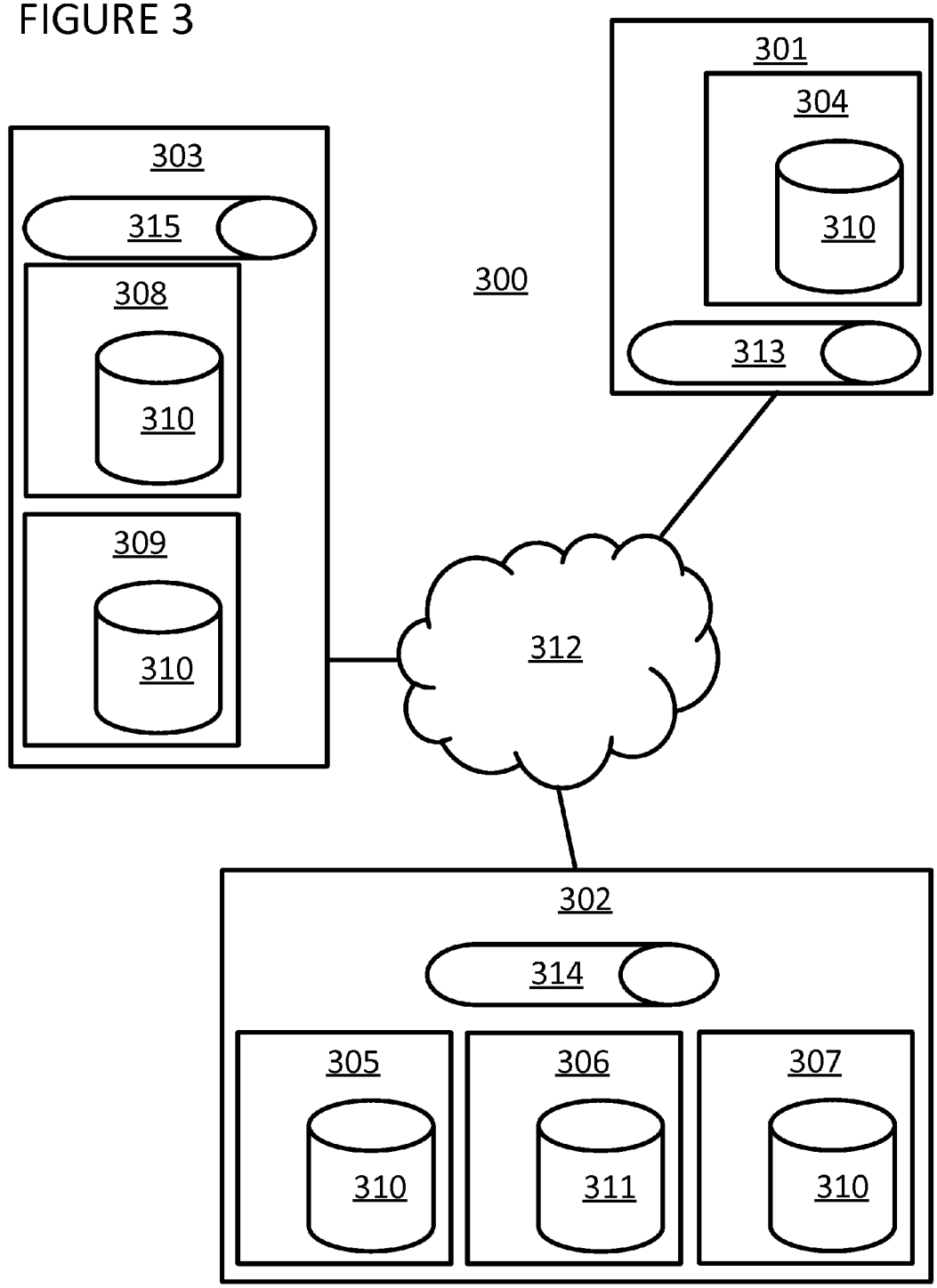
FIG. 3 illustrates a distributed storage architecture of an exemplary payment system.

FIG. 3 shows a distributed storage architecture 300 of an exemplary payment system of a payment service. The payment system utilizes the distributed storage architecture 300 to provide low latency processing and redundancy across any geographic area. The payment system can operate across a geographic area with three locations 301, 302, and 303. At the location 301, a single payment service participant, a financial network 304, can operate (i.e., the financial network 304 can have one or more computing nodes at the location 301). At location 302, a payment processor 305, a financial institution 306, and a merchant 307 can operate (i.e., the payment processor 305, the financial institution 306, and the merchant 307 can each have one or more computing nodes at location 302). At the location 303, two merchants 308 and 309 can operate (i.e., the two merchants can each have one or more computing nodes at the location 303). Any payment service participant can also have operations at more than one location (e.g., a merchant can have operations at location 302 and at the location 303 as illustrated). Each location can also have one or more additional operating nodes (not illustrated) that may be related or unrelated to the payment service.

Each payment service participant can store its own data elements 310, i.e., those data elements that are associated directly with the payment service participant, in a local cache of data elements. The local cache of data elements can be considered a second storage device and can include one or more physical storage devices. For example, the financial institution 306 at location 302 can be a bank that stores all transaction, ledger, account, and other bank information in its corresponding local cache of data elements 311. Thus, the stores of data elements managed by each payment service participant can be siloed from other stores of data elements. Though not illustrated, the data elements can also be stored remote from a payment service participant, for example, the bank can remotely access its data elements. Regardless of where the data elements for a payment service participant are physically stored, it is generally understood that the payment service participant can have a greater degree of control over its data elements than other payment service participants—therefore, the payment service participants may desire to have their data elements stored physically closer to their operations.

Nodes at the locations 301-03 can communicate to each other through a network 312, such as the Internet or a wide area network (WAN). Though not illustrated, the network can connect to a central repository of the payment service. Though not illustrated, it is assumed that each location can have a network infrastructure that allows nodes at the location to communicate with other nodes without having to traverse a potentially higher latency network that spans multiple locations. For example, if location 301 is a metropolitan area, location 301 can utilize a metropolitan area network (MAN), if location 302 is an area with large spatial scope, location 302 can utilize a wide area network (WAN), and if location 303 is a college campus, location 303 can utilize a campus area network (CAN) or other local area network (LAN).

The payment system can reduce latency by caching stored hierarchies storing hierarchy data at the various locations. As illustrated, location 301 has a cached hierarchy 313, location 302 has a cached hierarchy 314, and location 303 has a cached hierarchy 315. Each of the cached hierarchies can be examples of a first storage device, though a storage device can include one or more physical machines. Each of the cached hierarchies can reduce data access latency by serving the cached hierarchy's location. For example, all payment service participants at location 301 can access the cached hierarchy 313, all payment service participants at location 302 can access the cached hierarchy 314, and all payment service participants at location 303 can access the cached hierarchy 315, rather than having to access hierarchy data across the network. The cached hierarchies 313-15 can be stored in any logical storage system such as an in-memory NoSQL database, a memory caching system such as memcached, or any other logical storage system that allows fast data access.

Figure 4:
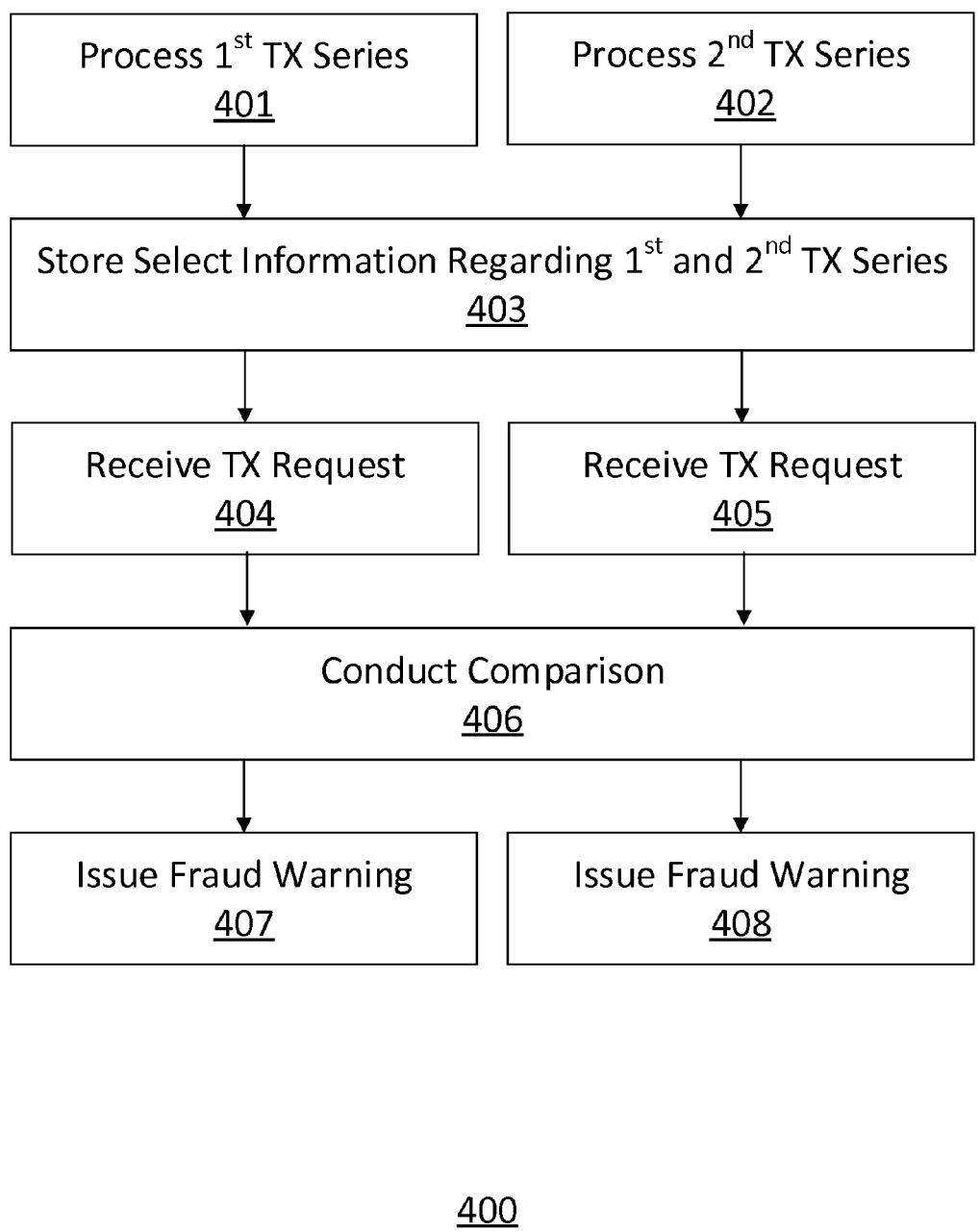
FIG. 4 illustrates a flow chart of a method for fraud monitoring in a payment system.

FIG. 4 illustrates a process 400 for fraud monitoring in a payment processing system. Process 400 begins with steps 401 and 402 in which separate servers in the payment system continually process a first and a second series of transaction requests. Steps 401 and 402 may occur in parallel. Process 400 continues with step 403 in which selected information regarding the transactions in the first and second series of transaction requests are pulled from the transaction details as they are being processed, and are then stored in a distributed cache as historical transaction information. The transaction details pulled from the transaction requests could include all of the available information included regarding the transaction. Part of step 403 is server specific, but the step involves both servers as the distributed cache synchronizes the historical transaction information to a risk service located at the same locale in each of the separate servers. In step 404, a transaction request is received at the first server. Alternatively, the method can continue with step 405 in which a transaction request is received at the second server. In step 406, information regarding the current transaction is compared with historical transaction information stored in the distributed cache. The historical transaction information is accessible to the first server at the first server's locale, and is accessible to the second server at the second server's locale. The historical transaction information can be accessible via a risk service located at each of the first and second locales.

The comparison and analysis conducted in step 406 will determine whether or not the most recently received transaction has triggered one of the fraud monitoring rules in the system. If the fraud rules provided by the risk service are not tripped, the process will conclude at this step, and the payment system will return to steps 401 and 402. Optionally, at some point after steps 404 and 405 commence, but before the process concludes, information regarding the transaction requests received in steps 404 and 405 can be pulled from the transaction requests and be stored in the distributed cache. If the fraud rules provided by the risk services are tripped, the method will proceed to step 407 or 408 depending upon which server received the transaction that tripped the risk service and issued the fraud warning. In one embodiment, when the fraud rules provided by the risk services are tripped, the risk service immediately communicates this information to the server to deny, suspend or flag the transaction. In another embodiment, the server continuously queries the risk service for information. In step 407, the first server tripped the rule and issues a fraud warning. In step 408, the second server tripped the rule and issues a fraud warning. The payment system can (i) utilize the fraud warning to deny the latest transaction request, (ii) trigger an automated or live operator call to the account holder associated with the latest transaction request, (iii) store the fraud warning in a central database, and/or (iv) alert a merchant involved with the transaction request that additional verification steps are required before the transaction can be approved.

Various kinds of information regarding the series of transactions received by the payment processor can be selected and stored in step 403. This information can comprise the transaction details that are stored in the distributed cache 210 described above. Expanding on the examples provided above, the historical transaction information and transaction details can be comparative information concerning a set of transactions in the series of transactions such as a cumulative distance between the geographical locations of each transaction in the set of transactions or a cumulative amount of funds involved in the set of transactions. For example, in a series of three transactions: A, B, and C, the distributed cache stores a value corresponding to the geographical distance between the location of transaction A and the location of transaction B added to the geographical distance between the location of transaction C and the location of transaction B. In a further example using the same series of transactions, the distributed cache could store a value corresponding to the sum of all the funds involved with each of transactions A, B, and C. The historical transaction information and transaction details could relate to a single user account, a set of accounts associated with a single financial institution, or all the accounts utilized in the payment service.

The stored information could be compared to details of a new, most recently received, transaction request to assure that the cumulative amount spent by an account holder did not exceed a preset spending limit. This is an advantageous application, because calculating a cumulative spending history for an account holder in the payment system is a procedure that would otherwise require intensive resources from a central database. The cumulative spending history query is resource intensive because numerous lookups are required to find the amounts of each transaction associated with a specific account, and those amounts must be summed with an amount from the current transaction before being compared with the cumulative spending limit. If instead information about a set of transactions is stored on distributed cache 210, both the amount of a most recent request received by a recipient server and a cumulative total of that set of transactions would be available at the recipient server such that there would be no need to access central database 206. The recipient server could then issue the fraud warning immediately if necessary.

Risk services 207-9 can be configurable to set different fraud monitoring rules. They can likewise be configurable to apply different monitoring rules based on an identity of the user requesting a transaction or based on a financial institution that administers the funding source that will be involved in the requested transaction. Financial institutions may modify the properties of risk services 207-9 through an administration portal. The portal may allow them to set what kinds of rules should be used in order to monitor for fraud. Once the rules have been selected, the portal will also allow them to set various variables associated with the selected rule. For example, a financial institution might use the portal to choose to set a rule on cumulative spending, and set a $500 maximum to the amount that may be spent in a single day using any account they administrate. If a transaction request would exceed this limit, the transaction may be flagged, suspended or denied. The portal may also be accessible to the payment service itself and allow it to configure different rules for particular financial institutions, or set global rules for use of the payment system as a whole. The rules can be set to only apply to specific financial institutions or to specific users such that the accounts of high risk individuals could be subjected to more stringent fraud monitoring rules. The rules can be stored in the risk service.

In specific embodiments of the present invention, the payment system is able to configure rules in a risk service to be specific to particular financial institutions and users because the payment system will include data in the transaction requests that identify what financial institutions and users are involved in the transaction. For example, each transaction request may be tagged with an identifier indicating that the current transaction involves a specific financial institution or a particular user account. The risk service may then use these identifiers to calculate that user's cumulative spending on past transactions by summing the total funds involved in all transactions stored in the distributed cache that are associated with that user with the amount of the current transaction. The risk service could likewise use the identifier in the most recently received transaction to look up what fraud monitoring rules should be applied based on the identifiers for the user and financial institution that are included with the transaction request. For example, a most recently received transaction could include an identifier for a financial institution that uses a cumulative spending fraud monitoring rule so the risk service would know to apply that rule to the received transaction request. In one embodiment, the risk service may strip the required information from the transaction requests as they are received. In another embodiment, the server may handle this operation separately and pass the identifiers to the risk service.

The payment system described with reference to FIG. 2 may include a reaper process used to minimize the resource requirements of distributed cache 210. The reaper process could have access to the distributed cache. The reaper could be configured with a predetermine reaper period and reaper window. The reaper period would set how often the reaper process was initiated and the reaper window would determine which transactions the reaper process removed every time it was executed. For example, a reaper period of one day and a reaper window of five hours would set the reaper process to run once a day, and only preserve transaction details for transactions that occurred in the last five hours. Therefore, the maximum space required of the distributed cache would be twenty-nine hours of transaction history, and at least five hours of transaction details would be preserved to maintain security.

The reaper process could be configured to tradeoff resource consumption and security. These tradeoffs could be set independently on a user-specific basis or on a financial institution basis. For example, the configurable reaper period could be set to zero such that the reaper process would be continuously running to manage resources on the distributed cache. The reaper window could also be set to zero such that all transactions were purged from distributed cache 210 on a periodic basis. As mentioned, the reaper process could also remove transaction details based on an identity of a user or a financial institution and purge the distributed cache in a staggered fashion such that subgroups of users and financial institutions had their data purged at different times. The financial institution and payment service could configure the reaper period and reaper window through the use of an administration portal to achieve the tradeoffs mentioned above. The payment service could also configure the reaper period and window on behalf of a specific financial institutions in order to provide a level of risk limiting that was requested by a financial institution. For example, the payment service could enter into an agreement with a financial institution to always maintain at least a day's worth of transaction details in the distributed cache, and to run the reaper process at the close of business local time each day. To implement this policy, the payment service would set both the reaper window and reaper period to one day. The length of the reaper window and frequency of the reaper period could be linked to a fee charged to the financial institution such that the fee charged would increase in direct proportion to the amount of data to be stored on the distributed cache for a given policy.

The process of minimizing the resources necessary to facilitate a particular fraud monitoring program selected by a financial institution, or by the payment service generally, could be selected in various ways. The process will depend on the amount of historical information the fraud monitoring program is interested in analyzing. For example, a financial institution may want to monitor one day's worth of transactions for each of its users, and assure that the cumulative amount spent during each day was less than $500. In this situation, the minimum resources in terms of storage space would be obtained by having the reaper process run continuously (i.e., with the reaper period equal to zero), and the reaper window set to one day. However, running the reaper process consumes processing resources, so the optimum selection of the reaper period and reaper window requires an additional tradeoff based on the efficiency of the reaper process. Therefore, a more practical approach might be to have the reaper period set to half a day, and the reaper period set to one day.

Another example of implementing a fraud monitoring policy involves setting the reaper window to zero to thereby purge the distributed cache every reaper period. Under this approach, the distributed cache could avoid having to store time stamps among the other transaction details in the distributed cache. One downside to this approach is that the fraud monitoring capabilities of the system would be diminished immediately after the purge because there would be no historical data to frame an analysis of the most recently received data. In addition, in the absence of a staggered purge, storage resources would be left unused by this approach as the minimum storage resources allocated to the distributed cache would be empty and useless following the purge. However, using a reaper window of zero in combination with staggered purging in which the reaper process was run for different users or financial institutions at different times could act against this inefficiency by always maintaining data in the distributed cache.

Returning to the example of risk services 207-9 monitoring the cumulative spending of a particular user, the reaper window could be set in combination with the amount of cumulative spending in order to monitor the velocity of funds exiting the account. For example, the cumulative spending limit could be set to $100 and the reaper period could be set to one day with the reaper process running continuously. In this case, the reaper process would be eliminating any transaction not necessary to implement a fraud monitoring rule that implemented a $100 per day limit on an account with the payment service.

In another example, while risk services 207-9 are active, the reaper process could be initiated every time a certain number of transactions took place. In this way, after a larger amount of transactions, all transactions are purged from distributed cache 210 thus freeing up resources. This may be beneficial during periods in which large numbers of transactions were taking place such as during peak holiday shopping days. Another fraud monitoring rule that would benefit from being combined with a reaper process is one that placed a limit on the cumulative geographical distance between transaction locations in a given time period. Risk service 207-9 could monitor the cumulative distance between transactions in combination with a reaper window set to the expected distance an account holder could travel in a given period of time. Financial institutions that served people known to have limited mobility could set the reaper window to an hour and the cumulative distance that could be traveled by foot in an urban area. In this situation, the number of transactions that would need to be monitored would be limited by a tight window and the resource constraints placed on the distributed cache would likewise be limited. This would be a cost effective solution for financial institutions that could not afford the fees associated with heavy use of the distributed cache.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. For example, nothing in the disclosure should be read to limit the payment processor to one that processes transactions using any specific kind of payment instrument, such as credit cards, as any form of electronic payments could potentially benefit from the teachings of this disclosure. In particular, the servers that process the payment transactions could be similar to the MOBI account server, described in U.S. Patent Publication No. 2009/0024533 A1 for "Payment Systems and Methods" filed Aug. 29, 2007, or U.S. patent application Ser. No. 13/755,421 for "Self-authenticating peer-to-peer transaction" filed Jan. 31, 2013, both of which are owned by the assignee of the present invention, and both are incorporated by reference herein in their entirety. Furthermore, nothing in the disclosure should indicate that the invention is limited to systems and methods that involve a payment system that processes payments for the same user at different datacenters, as the present invention can facilitate fraud monitoring for payment systems that process payments for the same user on servers at different locales even if all of the servers are located in the same datacenter.

In general, any diagrams presented are only intended to indicate one possible configuration, and many variations are possible. Those skilled in the art will also appreciate that methods and systems consistent with the present invention are suitable for use in a wide range of applications encompassing any related to transaction processing and fraud detection.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A system comprising:
   a first server located at a first locale and routing a first series of purchase transaction requests for a payment service;
   a second server located at a second locale and routing a second series of purchase transaction requests for said payment service;
   a central database that is remote from said first and second locales and stores transaction data of said first and second series of purchase transaction requests;
   a distributed cache that is connected to said central database and stores and synchronizes a set of transaction details across said first and second locales, rather than at said central database; and
   a risk service operating at said first locale and having access to said set of transaction details from said distributed cache at said first locale without accessing said central database;
   wherein said risk service generates a fraud warning based on a result of a comparison of at least one transaction detail in said set of transaction details and at least one transaction detail of a new purchase transaction request received at said first server.

2. The system of claim 1, wherein:
   said first and said second series of purchase transaction requests are associated with a set of purchases made by a single account;
   said set of transaction details include a cumulative amount of money spent in said set of purchases; and
   said comparison compares a sum of said cumulative amount of money and a purchase amount of said new purchase transaction against a predetermined amount.

3. The system of claim 1, further comprising:
   a load balancer dividing a third series of purchase transaction requests into said first and second series of purchase transaction requests;
   wherein said first server and said second server are both located in a single data center.

4. The system of claim 1, wherein:
   said first and said second series of purchase transaction requests are associated with a single account;
   said set of transaction details include a geographical distance between a purchase transaction request in said second series of purchase transaction requests and said new purchase transaction request, said purchase transaction request in said second series of purchase transaction requests and said new purchase transaction request not being at a same geographical location; and
   said risk service generates said fraud warning when said geographical distance is greater than a predetermined distance.

5. The system of claim 1, wherein said risk service is located in said distributed cache.

6. The system of claim 1, wherein said risk service comprises a set of configurable fraud monitoring rules.

7. The system of claim 6, wherein:
   said first and said second series of purchase transaction requests are for a set of purchases; and
   said set of configurable fraud monitoring rules vary based on an identity of a financial institution serving as a funding source for said set of purchases.

8. The system of claim 1, further comprising:
   a reaper having access to said distributed cache;
   wherein:
   said set of transaction details include a time stamp of when a particular purchase transaction request in said first series of purchase transaction requests was processed;
   a subset of transaction details in said set of transaction details describe said particular purchase transaction request; and
   when initiated, said reaper conducts a reaper process in which said subset of transaction details are cleared from said distributed cache if said time stamp indicates said particular purchase transaction request was processed more than a predetermined length of time in the past.

9. The system of claim 8, wherein:
   said reaper is initiated according to a configurable reaper period defining how often said reaper process is initiated;
   said predetermined length of time is a configurable reaper window; and
   said configurable reaper period and said configurable reaper window vary based on an identity of a financial institution associated with said particular purchase transaction request.

10. The system of claim 8, wherein said reaper is located in said distributed cache.

11. A computer-implemented process comprising:
    processing a first series of purchase transaction requests at a first server;
    processing a second series of purchase transaction requests at a second server;

storing transaction data concerning transactions associated with said first and said second series of purchase transaction requests in a central database;

storing historical transaction information in a distributed cache, rather than in the central database, the distributed cache being connected to said central database;

receiving a purchase transaction request;

conducting a comparison of information regarding said purchase transaction request with said historical transaction information by accessing said distributed cache without accessing said central database; and issuing a fraud warning based on results of said comparison;

wherein said first and said second series of purchase transaction requests are associated with a single user account;

wherein said first and second servers are in different locales;

wherein said distributed cache is at said different locales and synchronizes the historical transaction information across the different locales, rather than in the central database; and wherein said central database is remote from said different locales.

12. The process of claim 11, further comprising:
processing said first and second series of purchase transaction requests;
wherein said historical transaction information includes a cumulative amount of money expended via the processing of said first and second series of purchase transaction requests.

13. The process of claim 11, wherein:
said historical transaction information includes a first geographical location of a purchase transaction request from said first series of purchase transaction requests; and
said purchase transaction request is received via said second server.

14. The process of claim 11, further comprising:
dividing a third series of purchase transaction requests into said first and second series of purchase transaction requests using a load balancer;
wherein said first server and said second server are both located in a single data center.

15. The process of claim 11, wherein said comparison is conducted using a risk service that is programmable to set fraud monitoring rules by a user.

16. The process of claim 15, wherein said fraud monitoring rules: (i) are based on an identity of the user requesting a transaction, or (ii) are based on a financial institution administering a funding source involved in said purchase transaction request.

17. The process of claim 11, further comprising:
setting a predetermined reaper period; and
initiating a reaper process when said reaper period has elapsed, said reaper process removing a portion of said historical transaction information from said distributed cache;
wherein said portion comprises historical transaction information that has been stored in said distributed cache for longer than a predetermined reaper window.

18. The process of claim 17, further comprising:
receiving a configuration message from a financial institution;
wherein said configuration message determines said predetermined reaper window; and
said portion consists of historical transaction information that has been stored in said distributed cache for longer than said predetermined reaper window and contains information regarding transactions that create an obligation for said financial institution to transfer or receive funds.

19. The process of claim 18, wherein said fraud warning comprises restricting said purchase transaction request.

20. A system comprising:
a first server located at a first locale and routing a first series of purchase transaction requests for a payment service;
a second server located at a second locale and routing a second series of purchase transaction requests for said payment service;
a central database that is remote from said first and second locales and stores transaction data of said first and second series of purchase transaction requests;
a distributed cache that is connected to said central database and stores and synchronizes a set of transaction details across said first and second locales, rather than at said central database; and
a risk service having access to said set of transaction details from said distributed cache without accessing said central database;
wherein said risk service generates a fraud warning based on a result of a comparison of at least one transaction detail in said set of transaction details and at least one transaction detail of a new purchase transaction request received by said first server; and
wherein said first and second series of purchase transaction requests are associated with a single payment service user account.

* * * * *